United States Patent
Bryne

(10) Patent No.: US 6,425,304 B1
(45) Date of Patent: Jul. 30, 2002

(54) CLIPLESS PEDAL AND METHOD FOR ASSEMBLING IT

(75) Inventor: Richard M. Bryne, Del Mar, CA (US)

(73) Assignee: Speedplay, Inc., San Diego, CA (US)

( * ) Notice: Subject to any disclaimer, the term of this patent is extended or adjusted under 35 U.S.C. 154(b) by 54 days.

(21) Appl. No.: 09/728,799

(22) Filed: Dec. 1, 2000

(51) Int. Cl.⁷ ................................................. G05G 1/14
(52) U.S. Cl. ...................... 74/594.6; 74/594.4; 36/131
(58) Field of Search ........................... 74/594.6, 594.4; 36/131, 132, 134; D12/125

(56) References Cited

U.S. PATENT DOCUMENTS

| | | | |
|---|---|---|---|
| 590,685 A | 9/1897 | Matthews | 74/594.6 |
| 3,964,343 A | 6/1976 | Lauterbach | 74/594.6 |
| 4,864,887 A | 9/1989 | Rapisarda | 74/534.6 |
| 4,898,063 A | 2/1990 | Sampson | 74/594.6 |
| 4,942,778 A | 7/1990 | Bryne | 74/594.6 |
| 5,131,291 A | 7/1992 | Beyl | 74/594.6 |
| 5,203,229 A | 4/1993 | Chen | 74/594.6 |
| 5,213,009 A | 5/1993 | Bryne | 74/594.6 |
| 5,325,738 A | 7/1994 | Bryne | 74/594.6 |
| 5,417,128 A * | 5/1995 | Beyl | 74/594.6 |
| 5,497,680 A | 3/1996 | Nagano | 74/594.6 |
| 5,505,111 A | 4/1996 | Nagano | 74/594.6 |
| 5,522,282 A | 6/1996 | Nagano | 74/594.6 |
| 5,546,829 A | 8/1996 | Byrne | 74/594.6 |
| 5,862,716 A | 1/1999 | Bryne | 74/594.6 |
| 5,868,043 A | 2/1999 | Ueda | 74/594.6 |
| 5,992,266 A * | 11/1999 | Heim | 74/594.6 |
| 6,923,169 * | 9/2001 | Takahama | 74/594.6 |

FOREIGN PATENT DOCUMENTS

| | | | |
|---|---|---|---|
| EP | 0 293 340 | 11/1988 | ............ A43B/5/14 |
| WO | WO-9914107 A1 * | 3/1999 | ............ B62M/3/08 |

OTHER PUBLICATIONS

Jackson M. Lynch of Bicycle Guide magazine article of Road Bike Clipless Pedal Systems, Aug., 1993, pp. 43–45, 52.
C4 USA Power Transfer System brochure of spindles, 2000.
Wellgo brochure of pedals and accessories, 2000.
VeloNews magazine article of mountain–bike pedals, Apr. 28, 1997, p. 30.
Time advertisement of MTB pedals, 2000.

* cited by examiner

Primary Examiner—Thomas R. Hannon
Assistant Examiner—Justin Stefanon
(74) Attorney, Agent, or Firm—Sheppard, Mullin, Richter & Hampton LLP; James R. Brueggemann

(57) ABSTRACT

An improved clipless pedal of the kind having forward and rearward cleat retainers configured to releasably secure the cleat of a rider's shoe and prevent an unintended release of the securement. The pedal includes a special wall/stop fixture that defines forward and rearward walls for preventing the cleat from moving forwardly or rearwardly relative to the pedal by an amount that otherwise would be sufficient to cause an unintended disengagement of the cleat from the pedal. These walls have no effect on the intended release of the cleat from the pedal, which is accomplished by rotating the shoe about an axis perpendicular to the pedal's upper face.

11 Claims, 3 Drawing Sheets

ND METHOD FOR
CLIPLESS PEDAL AND METHOD FOR ASSEMBLING IT

BACKGROUND OF THE INVENTION

This invention relates generally to pedals for use on bicycles and the like, and, more particularly, to clipless pedals configured to releasably secure cleats attached to a rider's shoes.

Clipless pedals of this particular kind typically include forward and rearward cleat retainers mounted on the pedal's upper surface. One or both of these cleat retainers are configured to be forceably retractable apart from each other, to receive and releasably secure forward and rearward projections that are part of a cleat attached to the sole of a rider's shoe. The rider can release the cleat and shoe from the pedal simply by rotating the shoe by a predetermined amount about an axis perpendicular to the pedal's upper surface.

These clipless pedals typically further include a main body that is mounted for rotation on a spindle, with forward and rearward recesses being defined in the main body, on opposite sides of the spindle. Pivot rods are disposed within these recesses, generally parallel with the spindle, for supporting the forward and rearward cleat retainers. Each cleat retainer can include a coil wrapped around the associated rod and can further include an inverted U-shaped loop that projects upwardly from the coil to a position for engagement by a cleat projection. The coils function to yieldably resist pivoting movement of the two loops apart from each other.

Alternatively, the cleat retainers can incorporate similar U-shaped projections whose movement apart from each other is yieldably resisted by an elastomeric material. The cleat retainers can be formed of any suitable material, including stamped sheet metal, forged metal, or wire.

To release the shoe's securement to the pedal, the rider simply rotates the shoe by a predetermined amount, e.g, 15–20°, about an axis perpendicular to the pedal's upper surface. This causes laterally extending arms on the cleat to engage the forward and rearward cleat retainers and forceably urge the cleat retainers apart from each other, to release their retention of the cleat.

Optionally, the clipless pedals of the kind described briefly above can be configured as two-sided pedals, in which a second set of forward and rearward cleat retainers, identical to the first set, is located on the opposite side of the pedal's main body. This allows the pedal to secure the rider's shoe in either of two orientations. The forward cleat retainer of the first set can be integrated with the rearward cleat retainer of the second set; likewise, the rearward cleat retainer of the first set can be integrated with the forward cleat retainer of the second set.

The clipless pedals of the kind described briefly above have proven to be effective in providing a secure attachment of the rider's shoe, while at the same time allowing for a convenient and reliable release of the shoe. However, the pedals are not believed to be configured for effective operation in all circumstances. In certain riding conditions, the pedal can undesirably release its securement of the shoe.

More particularly, when the rider pulls upwardly on the pedal, the rider's ankle automatically will tend to pivot downwardly such that the upward force is applied to the pedal in a direction that includes a vector component toward the pedal's rear. This rearward force component is resisted by the rearward cleat retainer. However, if the rearward force is particularly strong, as for example when the rider accelerates from a stop, it can retract the rearward cleat retainer sufficiently to allow the cleat's front projection to escape from its retention by the forward cleat retainer, thereby releasing the cleat from the pedal. This, of course, is highly undesirable, and it can lead to a serious injury of the rider.

It should, therefore, be appreciated that there is a need for an improved clipless pedal of the kind that incorporates forward and rearward cleat retainers, which provides a reliable securement of a rider's shoe in substantially all riding conditions, including a rapid acceleration. The present invention satisfies this need and provides further related advantages.

SUMMARY OF THE INVENTION

The present invention is embodied in a clipless pedal configured to releasably secure a cleat attached to a rider's shoe in substantially all riding conditions. The pedal includes a main body mounted for rotation on a spindle and having an upper face configured for engagement with the cleat of a rider's shoe. Forward and rearward cleat retainers project upwardly from the upper face of the main body, on opposite sides of the spindle. These cleat retainers are sized and configured to be forceably retractable in forward and rearward directions apart from each other, so as to receive and retain forward and rearward projections that are part of the cleat, to secure the rider's shoe to the pedal. The cleat retainers are configured to be engaged by disengagement cams that are part of the cleat, to forceably retract the forward cleat retainer in a forward direction and the rearward cleat retainer in a rearward direction when the cleat is rotated about an axis generally perpendicular to the upper face of the main body. This releases the cleat and the rider's shoe from the pedal. Further, the upper face of the main body defines a forward wall located beneath the forward cleat retainer and a rearward wall located beneath the rearward cleat retainer. These walls are configured to prevent the cleat from moving non-rotationally in a forward or rearward direction relative to the pedal, by an amount sufficient to overcome the yielding bias of the forward or rearward cleat retainer and release the cleat from the pedal.

In a more detailed feature of the invention, the forward and rearward walls can be defined by a wall/stop fixture secured to the main body or they can be integrated as part of the main body. The wall/stop fixture can be formed as a one-piece or multi-piece component, and it can include forward and rearward arms that are positioned to engage the respective forward and rearward cleat retainers, to prevent the cleat retainers from moving closer to each other than a predetermined minimum distance.

In other more detailed features of the invention, the main body has a generally rectangular shape, and the cleat retainers are disposed within forward and rearward recesses, located on opposite sides of the spindle. Pivot rods are disposed within the respective forward and rearward recesses, oriented generally parallel with the spindle. The forward cleat retainer includes a coil wrapped around the forward pivot rod and an inverted U-shaped loop that projects upwardly from the coil to a position for engagement by the forward projection of the cleat, such that forward movement of the loop is yieldably resisted by the coil. Similarly, the rearward cleat retainer includes a coil wrapped around the rearward pivot rod and an inverted U-shaped loop that projects upwardly from the coil to a position for engagement by the rearward projection of the cleat, such that rearward movement of the loop is yieldably resisted by the coil.

In yet other more detailed features of the invention, the forward and rearward cleat retainers each include an inverted U-shaped loop having two upright legs and a cross bar. The inverted loops are positioned to be engaged by disengagement cams formed in the corners of the cleat when the cleat is rotated by a predetermined amount. This engagement forceably retracts the forward cleat retainer in a forward direction and the rearward cleat retainer in a rearward direction, to release the cleat and the rider's shoe from the pedal. The forward wall of the wall/stop fixture is located beneath and immediately forward of the cross bar of the forward U-shaped loop, between the loop's upright legs. Similarly, the rearward wall of the wall/stop fixture is located beneath and immediately rearward of the cross bar of the rearward U-shaped loop, between the loop's upright legs. The forward and rearward walls both can be arcuate, so as to limit forward and rearward movement of the cleat relative to the pedal over a range of angular orientations.

The pedal of the invention optionally can be configured to be two-sided, with the main body further having a lower face, opposite the upper face, also configured for engagement with the cleat of a rider's shoe. In such case, a second set of forward and rearward cleat retainers is provided, substantially identical to the first set of forward and rearward cleat retainers, but projecting downwardly from the lower face of the main body. The lower face of the main body defines forward and rearward walls, substantially identical to the walls on the pedal's upper face. These walls, which can be defined by a wall/stop fixture, are configured to prevent the cleat from moving non-rotationally in a forward or rearward direction relative to the pedal, by an amount sufficient to overcome the yielding bias of the forward or rearward cleat retainer and release the cleat from the pedal. The forward cleat retainer of the first set can be integrated with the rearward cleat retainer of the second set, and the forward cleat retainer of the second set can be integrated with the rearward cleat retainer of the first set.

Another aspect of the invention resides in a method for assembling the pedal. Specifically, the method includes a step of placing the forward and rearward cleat retainers in their positions on the pivot rods in the respective forward and rearward recesses, while the retainers are in an unstressed condition. The cleat retainers then are forceably retracted apart from each other, and the wall/stop fixture defining the forward and rearward walls is secured to the main body. Finally, the cleat retainers are released, such that they move back toward each other and into contact with the respective forward and rearward arms of the wall/stop fixture.

Other features and advantages of the present invention should become apparent from the following description of the preferred embodiment, taken in conjunction with the accompanying drawings, which illustrate, by way of example, the principles of the invention.

DESCRIPTION OF THE PREFERRED EMBODIMENT

Figure 1:
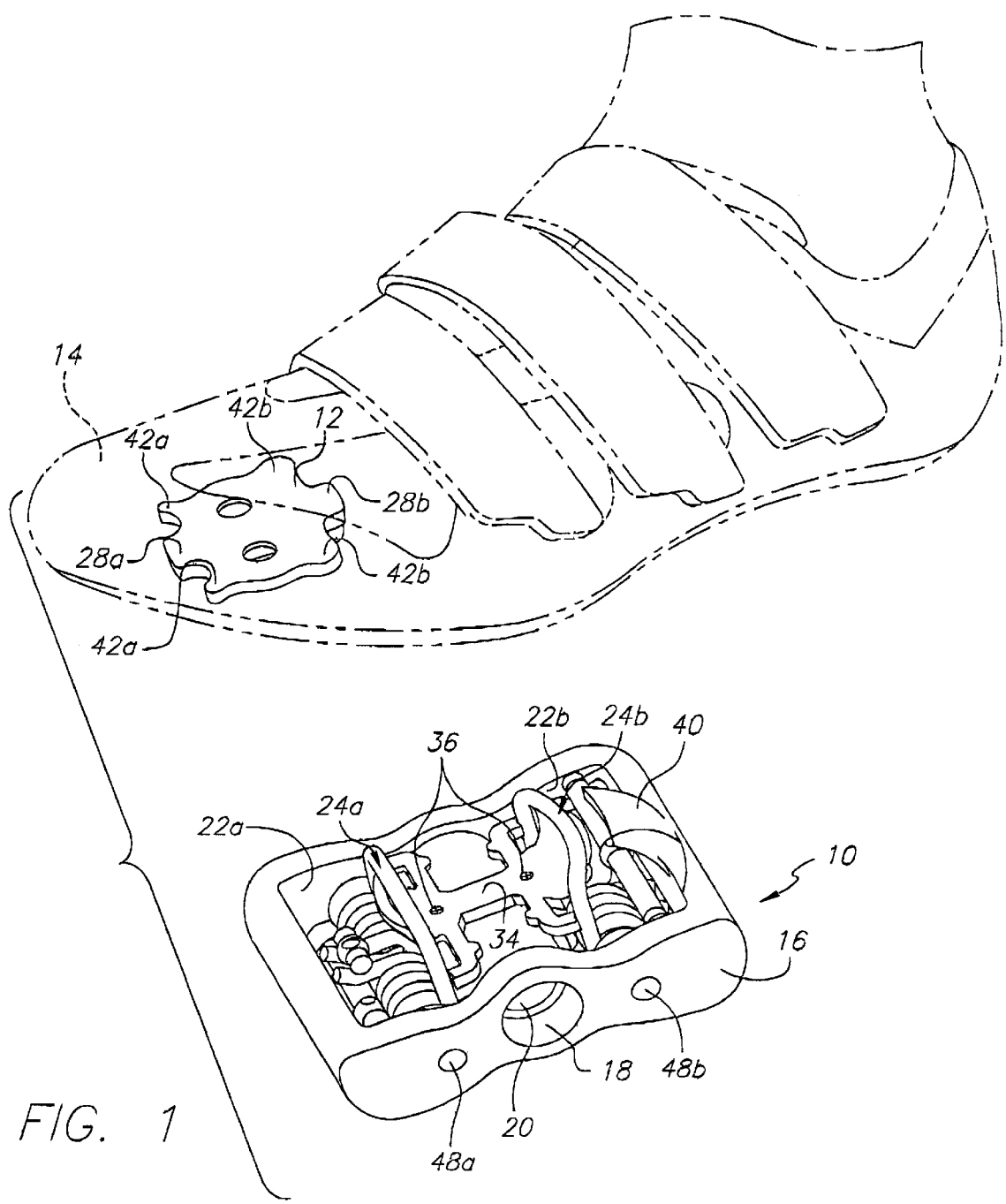
FIG. 1 is a perspective view of a clipless bicycle pedal in accordance with a preferred embodiment of the invention, shown with a rider's shoe and cleat in a position to be engaged and releasably secured by the pedal.
Figure 2:
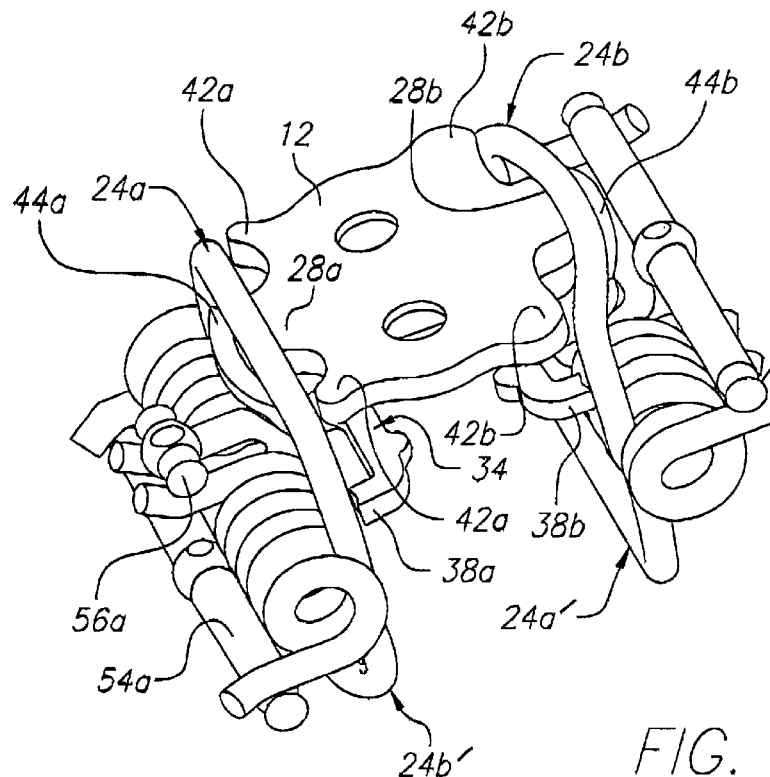
FIG. 2 is perspective view of the clipless bicycle pedal of FIG. 1, with the main body of the pedal being removed to reveal the structure of the pedal's forward and rearward cleat retainers, and with the cleat of the rider's shoe shown in its secured position.

With reference now to the illustrative drawings, and particularly to FIGS. 1 and 2, there is shown a clipless bicycle pedal 10 configured to releasably secure a cleat 12 attached by suitable conventional means to the sole of a rider's shoe 14. The shoe is depicted in phantom lines, so that the cleat can be seen. The depicted pedal is configured to function as the bicycle's left pedal, and it will be appreciated that the right pedal will be an identical mirror image of it. In addition, only the upper face of the pedal is visible in FIG. 1, and it will be appreciated that the pedal's lower face has an identical configuration. Several components of the pedal will be described below with reference only to the pedal's upper face, with corresponding components being located on the pedal's lower face.

As is conventional, the pedal 10 includes a main body 16 having a generally rectangular shape, with a transverse central bore 18 sized to receive a spindle 20 attached to the bicycle's pedal crank (not shown). The main body can be injection molded of any conventional material, e.g., plastic, or it can be made of a forged or cast metal, e.g., aluminum, magnesium or titanium. Forward and rearward recesses 22a and 22b are defined in the main body, on opposite sides of the spindle bore, and forward and rearward cleat retainers 24a and 24b are disposed within these recesses, for releasable engagement with the cleat 12. The cleat retainers include inverted U-shaped loops that project upwardly from the recesses and that are forceably retractable in forward and rearward directions apart from each other, so as to receive and retain forward and rearward projections 28a and 28b of the cleat. This releasably secures the cleat and shoe 14 to the pedal. The inverted U-shaped loop 24a includes upright legs 30a and a cross bars 32a, and the inverted U-shaped loop 24b includes upright legs 30b and a cross bar 32b.

A wall/stop fixture 34 is secured, e.g., by screws 36, to the upper face of the main body 16. This fixture includes a pair of forward arms 38a and a pair of rearward arms 38b, which are positioned to function as stops for the inverted U-shaped loops of the respective forward and rearward cleat retainers 24a and 24b. This prevents the cleat retainers from moving toward each other to positions any closer than the rest positions depicted in FIG. 1. In these rest positions, the upright legs 30a and 30b of the inverted U-shaped loops are oriented generally vertical relative to the pedal's upper face. From these depicted rest positions, the cleat retainers can be forceably moved apart from each other to receive and retain the cleat 12.

The inverted U-shaped loops of the respective forward and rearward cleat retainers 24a and 24b are sized to project above the pedal's main body 16 and wall/stop fixture 34 by a distance that allows the forward and rearward projections 28a and 28b of the cleat 12 to fit snugly beneath them. This prevents the cleat from moving vertically relative to the pedal 10.

A conventional ramp 40 projects upwardly from the rearward edge of the pedal's main body 16. This facilitates a convenient engagement of the cleat 12 by the two cleat retainers 24a and 24b. After the cleat has been secured to the pedal 10, the rider can release the securement simply by rotating the shoe 14 and cleat by a predetermined amount in either direction about an axis generally perpendicular to the pedal's upper face. Advantageously, the pedal is configured to allow the shoe to pivot about the center of the cleat, which generally is aligned with the ball of the rider's foot.

Figure 3:
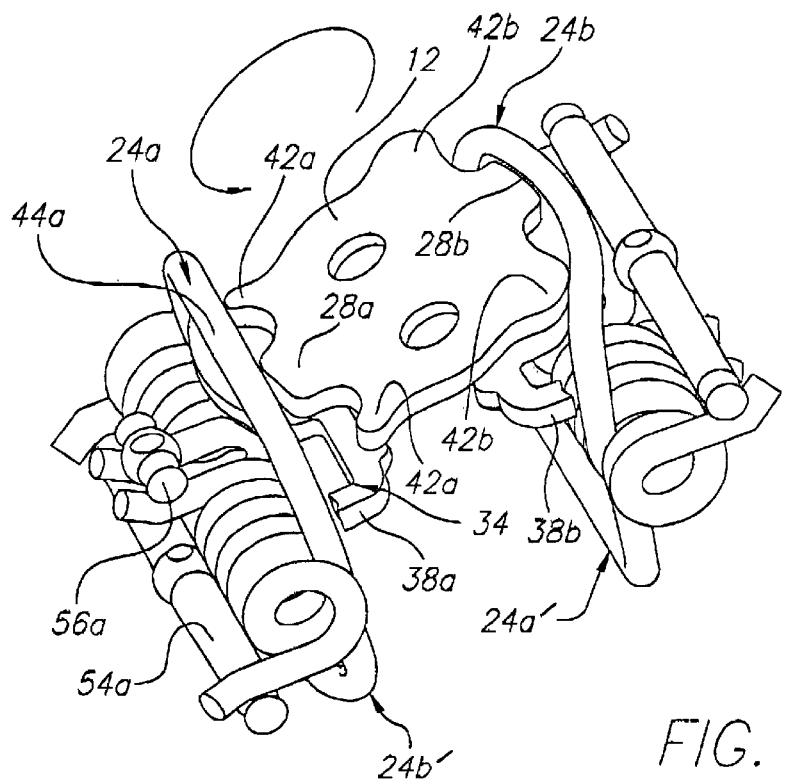
FIG. 3 is a perspective view of the clipless bicycle pedal, similar to FIG. 2, but with the cleat rotated sufficiently to be released from the pedal.

As best shown in FIGS. 2 and 3, the cleat 12 has a generally rectangular configuration, with forward engagement cams 42a located in its two forward corners and rearward engagement cams 42b located in its two rearward corners. When the cleat is secured to the pedal 10, the two forward cams are located immediately rearward of the inverted U-shaped loop of the forward cleat retainer 24a, and the two rearward cams are located immediately forward of the inverted U-shaped loop of the rearward cleat retainer 24b. Consequently, when the rider's shoe is rotated about an axis perpendicular to the pedal's upper face, one of the two forward engagement cams and one of the two rearward engagement cams will engage the adjacent U-shaped loop and cause the forward and rearward cleat retainers to pivotally retract apart from each other. If the shoe is rotated a sufficient amount, e.g., 15–20°, the cleat retainers will be retracted apart from each other by an amount sufficient to release the cleat.

In the past, bicycle pedals of this particular kind have sometimes released their retention of the rider's shoes at unintended times. This has occurred, for example, when the rider is attempting to accelerate rapidly by pulling upwardly on the pedal with a particularly strong force. Such an upward pull can cause the rider's ankle to pivot downwardly, which causes a vector component of the upward pull to be applied to the pedal in a rearward direction. This rearward force previously had been resisted only by the rearward cleat retainer, and sometimes the force was sufficient to retract the cleat retainer sufficiently to allow the cleat's front projection 28a to be released from the forward cleat retainer, thereby releasing the rider's cleat and shoe.

The pedal 10 overcomes this design deficiency of prior pedals by configuring the wall/stop fixture 34 to incorporate a forward wall 44a and a rear wall 44b, which function to prevent the cleat 12 on the rider's shoe 14 from moving forwardly or rearwardly relative to the pedal. The forward wall is located beneath the inverted U-shaped loop of the forward cleat retainer 24a, immediately forward of the cleat's forward projection 28a when the cleat is being retained. Similarly, the rearward wall is located beneath the inverted U-shaped loop of the rearward cleat retainer 24b, immediately rearward of the cleat's rearward projection 28b when the cleat is being retained. The forward and rearward walls offer no resistance to rotation of the cleat when the rider seeks to release the pedal's retention of it. In addition, the forward and rearward walls are arcuate, so as to prevent forward and rearward movement of the cleat even if the cleat has been partially rotated relative to the pedal. The wall/stop fixture can be conveniently made by stamping and forming a suitable sheet metal.

Figure 4:
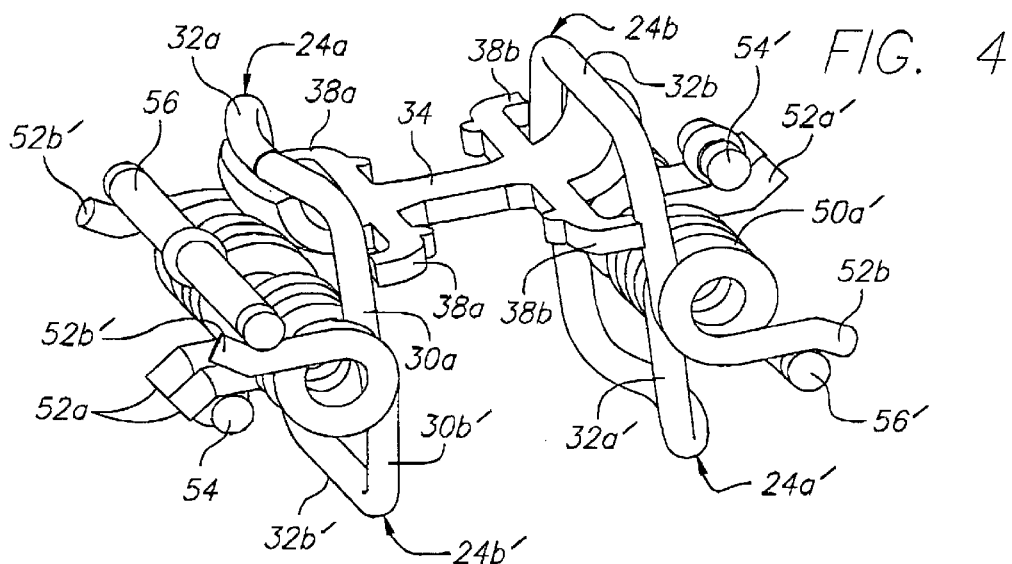
FIG. 4 is a perspective view of the clipless bicycle pedal, similar to FIG. 2, but with the cleat removed, to reveal the cleat retainer.
Figure 5:
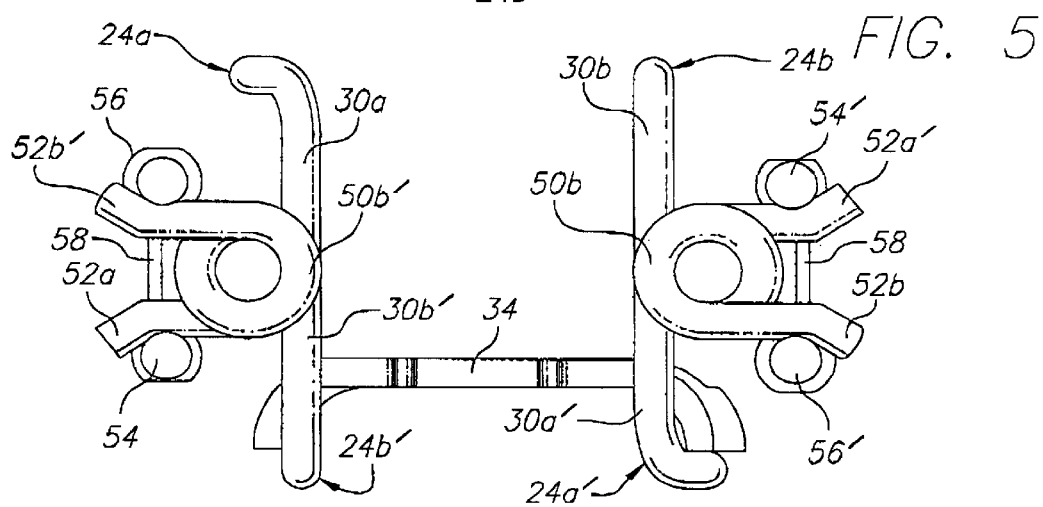
FIG. 5 is a side elevational view of the portions of the clipless bicycle pedal depicted in FIG. 4.
Figure 6:
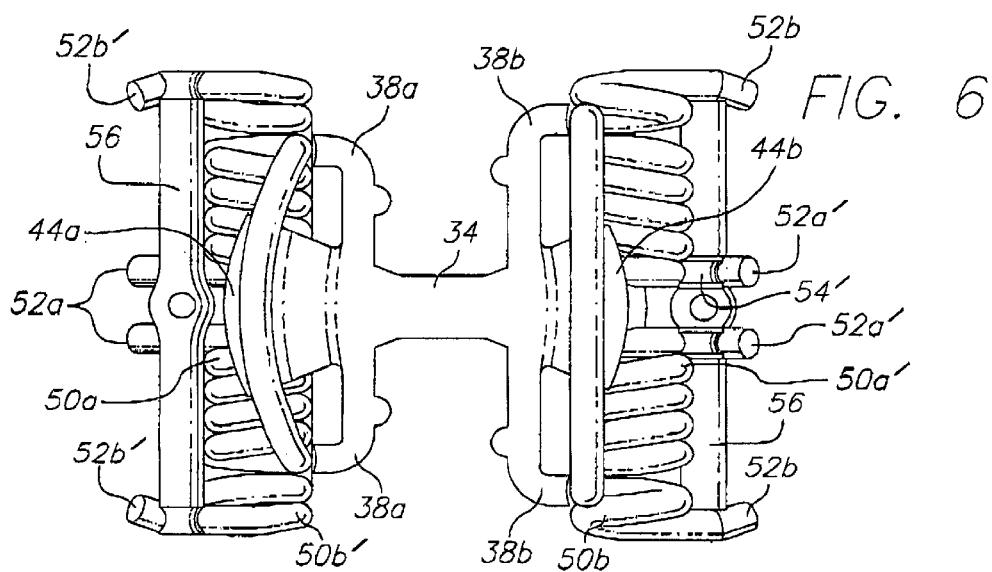
FIG. 6 is a top plan view of the portions of the clipless bicycle pedal depicted in FIG. 4.

As shown in FIGS. 4–6, it will be noted that the forward cleat retainer 24a of the pedal's upper face is integrated with the rearward cleat retainer 24b' of the pedal's lower face and, similarly, the rearward cleat retainer 24b of the upper face is integrated with the forward cleat retainer 24a' of the lower face. The structure and operation of the forward cleat retainer 24a and rearward cleat retainer 24b' will be described below. It will be understood that the forward cleat retainer 24a' and rearward cleat retainer 24b function in an identical manner.

The forward cleat retainer 24a and the rearward cleat retainer 24b' both are mounted on a pivot rod 46a disposed within the forward recess 22a formed in the pedal's main body 16, generally parallel with the axis of spindle 20. This pivot rod is held in its position by a press fit in bores 48a formed in the main body at the recess's opposite ends. Alternatively, the rod could be held in position by threads or by snap rings.

The forward cleat retainer 24a is formed from a single length of spring steel wire wound into a special shape, which includes the inverted U-shaped loop described above. The lower, or base, ends of the two upright legs 30a of the inverted U-shaped loop transition to separate coils 50a that wrap around the pivot rod 46a. Each such coil, in turn, transitions to a short finger 52a that projects in a forward direction from the coil. The two fingers abut against the upper side of a lower transverse tension adjustment bar 54.

The rearward cleat retainer 24b' similarly is formed from a single length of spring steel wire wound into a special shape. This shape includes the inverted U-shaped loop described above. The upper, or base, ends of the two upright legs 30b' of the inverted U-shaped loop transition to coils 50b' that wrap around the pivot rod 46a. Each such coil, in turn, transitions to a short finger 52b' that projects in a forward direction from the coil. These two fingers abut against the lower side of an upper transverse tension adjustment bar 56, which is spaced above the lower transverse tension adjustment bar 54.

The coils 50a of the forward cleat retainer 24a wrap around the pivot rod 46a at locations laterally outside the locations of the coils 50b' of the associated rearward cleat retainer 24b'. The upright legs 30a of the forward cleat retainer 24a, therefore, are located slightly further apart from each other than are the upright legs 30b' of the associated rearward cleat retainer 24b'.

An adjustable link 58 interconnects the upper tension adjustment bar 56 with the lower tension adjustment bar 54. This adjustable link preferably takes the form of a simple screw and threaded bore combination. The head of the screw is held with respect to one of the tension adjustment bars and the threaded bore is formed in the other. Tightening or loosening the screw relative to the threaded bore varies the distance between the two tension adjustment bars and thus the amount of pre-load on the forward cleat retainer 24a and rearward cleat retainer 24b'. One advantage of this structure is that it facilitates a convenient selection of the amount of torque required to release the cleat 12 and shoe 16 from the pedal 10. A threaded fastener could be substituted for the threaded bore.

Another advantage of the adjustable link 58 structure is that it facilitates a convenient assembly of the pedal 10. Specifically, the forward cleat retainer 24a and associated rearward cleat retainer 24b' are both placed in the forward recess 22a in an unstressed condition, and the pivot rod 46a then is extended through the coils 50a and 50b' of the two cleat retainers. The upper and lower tension adjustment bars 56 and 54 then are placed against the fingers 52a and 52b' of the respective cleat retainers and connected together by the adjustable link 58. This same assembly step is repeated for the rearward cleat retainer 24b and forward cleat retainer 24a'. An assembly fixture (not shown) then forceably retracts apart from each other the inverted U-shaped loops of the respective forward and rearward cleat retainers on the pedal's upper face. With the loops pulled apart, the wall/stop fixture 34 can be readily secured to the pedal's main body 16 by screws 36. The assembly fixture then releases the two U-shaped loops, and this same procedure is repeated for the forward and rearward cleat retainers on the pedal's lower face.

It will be appreciated that the spring retainers 24a and 24b could have many alternative configurations. In each case, the retainer should be sized and configured to retain the corresponding cleat projection and it should provide yielding resistance to any force imparted by rotation of the cleat. Movement apart of the retainers can be by a pivoting action, as about the depicted pivot rods, or it can be translational. In addition, the resistance force can be provided by means other than the depicted coils, e.g., by a suitable elastomer.

It will be appreciated from the foregoing description that the present invention provides an improved clipless pedal of the kind having forward and rearward cleat retainers for releasably securing the cleat of a rider's shoe. The pedal includes a special wall/stop fixture having forward and rearward walls that prevent the cleat from moving forwardly or rearwardly relative to the pedal by an amount that otherwise would be sufficient to cause an unintended disengagement of the cleat from the pedal. These walls have no effect on the intended release of the cleat from the pedal, which is accomplished by rotating the shoe about an axis perpendicular to the pedal's upper face.

It also will be appreciated that the invention has been described in detail with reference only to the presently preferred embodiment. It will be appreciated that various modifications can be made without departing from the invention. Accordingly, the invention is defined only by the following claims.

I claim:

1. A clipless pedal configured to releasably secure a cleat attached to a rider's shoe, wherein the cleat includes a forward projection and a rearward projection, the clipless pedal comprising:

a rotatable spindle;

a main body mounted for rotation on the spindle and having an upper face configured for engagement with the cleat of a rider's shoe; and forward and rearward cleat retainers projecting upwardly from the upper face of the main body, on opposite sides of the spindle;

wherein the forward and rearward cleat retainers are sized and configured to be forceably retractable in forward and rearward directions apart from each other, so as to receive and retain the respective forward and rearward projections of the cleat, to secure the rider's shoe to the pedal;

wherein the cleat includes disengagement cams that are positioned to engage and forceably retract the forward cleat retainer in a forward direction and the rearward cleat retainer in a rearward direction when the cleat is rotated about an axis generally perpendicular to the upper face of the main body, to release the cleat and the rider's shoe from the pedal;

and wherein the upper face of the main body defines a forward wall located adjacent to the forward cleat retainer and a rearward wall located adjacent to the rearward cleat retainer, wherein the forward and rearward walls are configured to prevent the cleat from moving non-rotationally in a forward or rearward direction relative to the pedal, by an amount sufficient to overcome the yielding bias of the forward or rearward cleat retainer and release the cleat from the pedal.

2. A clipless pedal as defined in claim 1, wherein:

the main body has a generally rectangular shape and it further has forward and rearward recesses, located on opposite sides of the spindle, in which are disposed the respective forward and rearward cleat retainers;

the clipless pedal further comprises forward and rearward pivot rods disposed within the respective forward and rearward recesses and oriented generally parallel with the spindle;

the forward cleat retainer includes a coil wrapped around the forward pivot rod and a loop that projects upwardly from the coil to a position for engagement by the forward projection of the cleat, wherein forward movement of the loop is yieldably resisted by the coil; and the rearward cleat retainer includes a coil wrapped around the rearward pivot rod and a loop that projects upwardly from the coil to a position for engagement by the rearward projection of the cleat, wherein rearward movement of the loop is yieldably resisted by the coil.

3. A clipless pedal as defined in claim 1, wherein the forward and rearward walls are defined by a wall/stop fixture that is a separate component secured to the main body.

4. A clipless pedal as defined in claim 3, wherein the wall/stop fixture is a one-piece component.

5. A clipless pedal as defined in claim 3, wherein the wall/stop fixture includes forward and rearward arms that are positioned to engage the respective forward and rearward cleat retainers, to prevent the cleat retainers from moving closer to each other than a predetermined minimum distance.

6. A clipless pedal as defined in claim 1, wherein:

the cleat is generally planar, with a generally rectangular configuration, and with the disengagement cams positioned in the corners;

the forward and rearward cleat retainers each include an inverted U-shaped loop having two upright legs and a cross bar; and the inverted U-shaped loops of the forward and rearward cleat retainers are positioned to be engaged by the disengagement cams of the cleat when the cleat is rotated by a predetermined amount, to forceably retract the forward cleat retainer in a forward direction and the rearward cleat retainer in a rearward direction, and thereby to release the cleat and the rider's shoe from the pedal.

7. A clipless pedal as defined in claim 6, wherein:

the forward wall of the cleat retainer is located beneath and immediately forward of the cross bar of the forward cleat retainer, between the two upright legs of the forward cleat retainer; and the rearward wall of the cleat retainer is located beneath and immediately rearward of the cross bar of the rearward cleat retainer, between the two upright legs of the rearward cleat retainer.

8. A clipless pedal as defined in claim 7, wherein:

the main body further has a lower face, opposite the upper face, also configured for engagement with the cleat of a rider's shoe;

the clipless pedal further comprises a second set of forward and rearward cleat retainers, substantially identical to the first set of forward and rearward cleat retainers, but projecting downwardly from the lower face of the main body; and the lower face of the main body defines forward and rearward walls substantially identical to the forward and rearward walls defined by the upper face of the main body and configured to prevent the cleat from moving non-rotationally in a forward or rearward direction relative to the pedal, by an amount sufficient to overcome the yielding bias of the forward or rearward cleat retainer and release the cleat from the pedal.

9. A clipless pedal as defined in claim 8, wherein the forward cleat retainer of the first set is integrated with the rearward cleat retainer of the second set, and the forward cleat retainer of the second set is integrated with the rearward cleat retainer of the first set.

10. A clipless pedal as defined in claim 1, wherein the forward and rearward walls are arcuate.

11. A method for assembling a clipless pedal as defined in claim 5, comprising:

securing the forward and rearward cleat retainers to the main body while in an unstressed condition;

forceably retracting the forward and rearward cleat retainers apart from each other;

attaching the wall/stop fixture to the main body; and releasing the forward and rearward cleat retainers such that they move toward each other and into contact with the respective forward and rearward arms of the wall/stop fixture.

* * * * *